Patented July 17, 1951

2,560,773

UNITED STATES PATENT OFFICE 2,560,773

SYNTHETIC WAX OF THE CARNAUBA TYPE

Stanley P. Lovell, Newtonville, Mass., assignor to Lovell Chemical Company, Watertown, Mass., a corporation of Massachusetts No Drawing. Application November 14, 1946, Serial No. 709,785

5 Claims. (Cl. 260—28.5)

The present invention comprises a novel synthetic wax having all the valuable characteristics of natural carnauba wax and, in addition, certain desirable properties peculiar to itself.

Carnauba wax has been highly prized for many years on account of its relatively high melting point, its freedom from tack, its ability to take a high polish, and its thixotropic properties which make it particularly useful as an ingredient for various polishing compounds. However, carnauba wax occurs naturally only in tropical regions which are accessible with difficulty and is therefore available only in limited quantities and at relatively high cost. The principal object of the present invention is to produce from staple raw materials a wax of this type which may be manufactured under convient commercial conditions and at a moderate cost.

The present invention is based on my discovery that under certain conditions it is possible to combine or react polyethylene with a microcrystalline wax to produce a new composition of matter having strikingly different characteristics from either of its components; and characteristics making it more desirable in many industries than carnauba wax or any other wax heretofore available. My new wax is not solvent in the solvents that affect either of its ingredients, but is soluble in certain solvents that do not affect its ingredients. It has a thixotropic characteristic found in neither of its ingredients. Its melting point of 216° F. is higher than the proportional melting point of either ingredient. Its dielectric strength is more than three times that of paraffin, and in the form of a polished film it is substantially more flexible and less brittle than a corresponding film of carnauba wax.

These and other features of my novel product will be best understood and appreciated from the following description of a preferred manner of manufacturing it.

The raw materials employed are ethylene and a microcrystalline mineral wax. Ethylene, the first member of the olefin series, is a colorless gas having a characteristic sweetish odor and a boiling point of −104° F. Ethylene is first polymerized by any of the well-known polymerization processes, as by heating at 300°–480° F. under a pressure of at least 1200 atmospheres, and for purposes of the present invention is maintained without cooling from the polymerizing step as a viscous liquid at a temperature approximating 400° F.

One suitable microcrystalline wax for purposes of the present invention may be prepared by oxidizing tankage from the petroleum fields of Chanute, Kansas, as by blowing hot air through it. The desired starting material, crude microcrystalline residue, is preferably obtained by settling from crude petroleum or various petroleum residues. Tank bottoms of Kansas petroleums are quite satisfactory. The resulting petroleum wax is of an amber color having a specific gravity of about .93, and a melting point of 190° F. Other oil-free microcrystalline waxes suitable for my purposes are produced by several companies well established in the oil industry.

Two to five parts of such molten microcrystalline petroleum wax are added to one part of molten polyethylene and heated together and stirred. The microcrystalline wax is at first apparently incompatible with the molten polyethylene and agglomerates into floating lumps in the mixture. This must be constantly stirred and gradually brought up to a temperature of approximately 400° F. As the heating and stirring continue, the mixture becomes very thick and viscous with the result that a great amount of energy must be supplied to keep the molten mixture in a state of agitation. As the heating and stirring progress and the temperature of the mixture approaches 400° F. the viscosity of the mixture begins to decrease, the lumps disappear and the mixture becomes grainy, showing small discrete particles. As the stirring is continued at 400° F., the mixture suddenly becomes relatively thin and homogeneous. This sudden change of form in the liquid mixture at high temperature is an indication that the reaction has been completed. The liquid mixture may accordingly be poured off into molds and allowed to cool and solidify in pigs or other shapes. In cooling it exhibits a contraction of approximately 12%.

The heating step above described is endothermic in character and requires an input of energy largely in excess of what might otherwise be expected. If the heating step is interrupted and then resumed, gas bubbles come off which burn with a greenish blue flame. Further it appears to be desirable to carry out the heating step while the molten mixture is in contact with iron. I do not attempt to explain this phenomenon, possibly the microcrystalline wax has the property of depolymerizing the polyethylene to a limited extent, or it may be that other chemical change is produced in the heating step which permits the final reaction to take place that results in the novel wax of my invention.

The characteristics of the resulting wax have already been discussed to some extent. Its crystals are substantially the same size as the crystals of carnauba wax but its material is substantially tougher and more flexible. It has a conchoidal fracture and in this resembles the finest vegetable waxes. In color it is a light yellowish brown and has a specific gravity of .9307. It will disperse when mixed with proper wetting agents such as 2 amino, 2 methyl, 1 propanol. It will not dissolve cold but will dissolve in hot aliphatic or olefinic solvents. It takes an extremely high polish and is not brittle either at moderate temperatures or at a temperature as low as 0° F. It is more desirable in this respect than carnauba wax which is substantially less flexible than leather at moderate temperatures and subject to minute fracture cracks and loss of surface polish because flakes or particles scale or chip from it when flexed. Having a high melting point it has less tendency to oxidation than waxes heretofore known. It has extremely high resistance to water, showing no observable increase in weight after being immersed for 24 hours. A film $1/1000$ of an inch in thickness of my novel wax has a dielectric breakdown resistance of 722 volts as compared to 220 volts for a similar film of carnauba wax. It can be blended with vegetable waxes, beeswax or petroleum waxes to produce a product having any desired melting point within a wide range. It is readily converted to a thixotropic gel by being dissolved hot in a hydrocarbon solvent and then allowed to cool. Its surface is entirely free from tackiness.

A significant characteristic of natural carnauba wax is its hardness. On a penetrometer at 100° F. 5 seconds; with 200 grains used, carnauba wax gives a reading of 11. Under identical conditions my new synthetic wax gives a reading of 12.

Again, many applications of a high melting-point wax depend on its fluidity in molten condition. My new wax has a viscosity of 230 centipoises at 320° F. in a Saybolt-Furol viscosimeter. It is thus suited for paper coatings of many sorts, and for use as a modifying ingredient in shoe stiffeners and general thermoplastic saturants.

That my novel wax is a new composition of matter seems to be demonstrated by the fact that its original constituents cannot be identified or removed by selective solvents, for example, the wax may be soaked in gasoline, kerosene, benzol, toluene, etc. for a long period without losing anything from its composition. Notwithstanding its high melting point of 216° F./102.2° C. it has a very sharp break and may be heated almost to that temperature without showing any loss of shape. Accordingly, if formed into a dish or cup it will stand sterilizing and will enable paper dishes or cup to withstand washing or sterilizing. It is extremely resistant to acids and alkalis and is therefore not affected by dry cleansing processes.

The synergistic properties herein set forth vary within a range affording a wide variety of useful applications. Viscosity when molten of a 35% polyethylene 65% microcrystalline petroleum wax product is such that it sets the top limit. At the other extreme, 7% polyethylene 93% microcrystalline wax is the universal modifying composition. The particular proportion to be used will be obvious after simple tests to one skilled in the trade or craft. Thus, to coat carbon paper where maximum hot flow is necessary, a relatively low polymerized ethylene proportion would be selected; to produce a shoe polish where maximum thixotropicity is necessary, a relatively high polymerized ethylene proportion would be chosen.

Having thus disclosed my invention and described in detail a preferred manner of putting it into effect, I claim as new and desire to secure by Letters Patent:

1. A yellowish brown wax having a melting point of approximately 216° F., specific gravity of 0.9307 and which is soluble in hot hydrocarbon solvents but not soluble in cold condition, and which is made by heating molten polyethylene and a microcrystalline petroleum wax prepared by oxidizing petroleum tankage together at a temperature approximating 400° F. and in the proportions approximating 35–7% polyethylene to 65–93% wax.

2. The process of making synthetic wax which consists in mixing molten polyethylene with molten microcrystalline petroleum wax prepared by oxidizing petroleum tankage, in proportions 7–35% polyethylene to 93–65% wax, gradually heating the mixture to approximately 400° F. and stirring the mixture vigorously while it exists as a lumpy mixture, then as a viscous liquid containing granular matter and finally as a homogeneous liquid, and subsequently cooling the molten mixture.

3. The process of making synthetic wax which includes the steps of separately heating and melting polyethylene and a microcrystalline petroleum wax prepared by oxidizing petroleum tankage, mixing the two in molten condition and in proportions 7–35% polyethylene to 93–65% wax, thus forming a lumpy mixture, raising the temperature of the mixture to approximately 400° F. while maintaining it in a state of continuous agitation until it becomes a homogeneous liquid, and then casting the liquid in solid shape.

4. The process of making synthetic wax which includes the steps of mixing molten polyethylene and a microcrystalline petroleum wax prepared by oxidizing petroleum tankage in proportions between 35% polyethylene to 65% microcrystalline wax and 7% polyethylene to 93% microcrystalline wax, raising the temperature of the molten mixture in the presence of iron to approximately 400° F. with continued and vigorous agitation until it becomes a homogeneous liquid, and then cooling the liquid in a mold.

5. A hard yellowish brown wax having a melting point of approximately 216° F. and a specific gravity of 0.93 to 0.95, made by reacting in liquid phase polyethylene at a temperature close to its decomposition point, viz. about 400° F. and a microcrystalline petroleum wax prepared by oxidizing petroleum tankage in proportions approximating 7–35% polyethylene to 93–65% wax.

STANLEY P. LOVELL.

REFERENCES CITED

The following references are of record in the file of this patent:

UNITED STATES PATENTS

| Number | Name | Date |
|---|---|---|
| 2,471,102 | Fish | May 24, 1949 |

OTHER REFERENCES

Midwinter, British Plastics, May 1945, pp. 208–215 and 228.